US007896126B1

(12) United States Patent
Haberman et al.

(10) Patent No.: US 7,896,126 B1
(45) Date of Patent: Mar. 1, 2011

(54) METHODS AND APPARATUS FOR SOUND SUPPRESSION

(75) Inventors: Robert C. Haberman, Mystic, CT (US); Robert J. Barile, Wakefield, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/641,494

(22) Filed: Dec. 18, 2009

(51) Int. Cl.

| | |
|---|---|
| ***F16F 15/023*** | (2006.01) |
| ***F16F 15/02*** | (2006.01) |
| ***F16F 15/04*** | (2006.01) |
| ***F01N 1/06*** | (2006.01) |
| *F16F 15/00* | (2006.01) |
| *F01N 1/00* | (2006.01) |

(52) U.S. Cl. .......................................... 181/209; 181/206

(58) Field of Classification Search .................. 181/209, 181/207, 206; 381/71.2, 71.1
See application file for complete search history.

(56) References Cited

U.S. PATENT DOCUMENTS

| | | | | | |
|---|---|---|---|---|---|
| 3,409,099 | A | * | 11/1968 | Wenger et al. | 181/30 |
| 3,411,605 | A | * | 11/1968 | Coffman et al. | 181/30 |
| 3,447,628 | A | * | 6/1969 | Shiflet | 181/30 |
| 4,276,954 | A | * | 7/1981 | Romano | 181/224 |
| 4,682,670 | A | * | 7/1987 | Lerner et al. | 181/287 |
| 4,815,050 | A | * | 3/1989 | Kurz | 367/176 |
| 4,875,312 | A | * | 10/1989 | Schwartz | 52/144 |
| 5,001,680 | A | * | 3/1991 | Black et al. | 367/151 |
| 5,138,588 | A | * | 8/1992 | Chuan et al. | 367/176 |
| 5,197,707 | A | * | 3/1993 | Kohan | 248/638 |
| 5,199,856 | A | * | 4/1993 | Epstein et al. | 417/312 |
| 5,210,720 | A | * | 5/1993 | Caprette et al. | 367/176 |
| 5,220,535 | A | | 6/1993 | Brigham et al. | |
| 5,240,221 | A | * | 8/1993 | Thomasen | 248/559 |
| 5,250,763 | A | * | 10/1993 | Brown | 181/155 |
| 5,337,288 | A | | 8/1994 | Sorathia et al. | |
| 5,530,211 | A | * | 6/1996 | Rogers et al. | 181/30 |
| 5,583,324 | A | * | 12/1996 | Thomasen | 181/199 |
| 5,924,261 | A | | 7/1999 | Fricke | |
| 5,971,096 | A | * | 10/1999 | Matsumoto et al. | 181/210 |
| 6,390,132 | B1 | * | 5/2002 | Johnson et al. | 138/30 |
| 6,446,454 | B1 | * | 9/2002 | Lee et al. | 62/296 |
| 6,478,110 | B1 | * | 11/2002 | Eatwell et al. | 181/207 |
| 6,547,049 | B1 | * | 4/2003 | Tomlinson | 188/379 |
| 6,634,457 | B2 | * | 10/2003 | Paschereit et al. | 181/229 |
| 6,638,640 | B2 | * | 10/2003 | Jee | 428/594 |
| 6,739,425 | B1 | * | 5/2004 | Griffin et al. | 181/171 |
| 6,802,386 | B2 | * | 10/2004 | Koelle | 181/224 |
| 7,267,196 | B2 | * | 9/2007 | Mathur | 181/208 |
| 7,540,353 | B2 | * | 6/2009 | Okawa et al. | 181/250 |
| 7,565,950 | B2 | * | 7/2009 | Hawkins et al. | 181/207 |
| 2007/0284185 | A1 | * | 12/2007 | Foss | 181/207 |

* cited by examiner

*Primary Examiner* — Edgardo San Martin
(74) *Attorney, Agent, or Firm* — Daly, Crowley, Mofford & Durkee, LLP

(57) ABSTRACT

Methods and apparatus for providing a sound suppressor device including a first plate, a second plate in opposition to the first plate, and a connector between the first and second plates such that the first plate, the second plate, and the connector define a sealed cavity containing a gas at a pressure, wherein the device has a resonant frequency selected to vibrate out-of-phase with respect to a noise source for suppressing noise from the noise source while the noise source and the device are immersed in a liquid.

15 Claims, 15 Drawing Sheets

METHODS AND APPARATUS FOR SOUND SUPPRESSION

BACKGROUND

As is known in the art, noise can be created inside surface ships and submarines by various sources, such as fluid-filled regions. Exemplary fluid filled regions include ballast tanks, fuel tanks, fresh water tanks, and additionally for the case of a submarine, the free flood sail. Fluid filled regions are not, however, restricted to surface ships and submarines. Any fluid filled region that is subject to mechanical or acoustic excitation can create noise. If not sufficiently suppressed, such noise can pose an acoustic hazard.

A common noise source is sound emitted from suction and discharge pipes inside the fluid-filled regions. The frequency spectrum of the noise typically contains both broadband and tonal components. An example of a low frequency tonal component noise source is pump rotation (e.g., imbalance, impeller blade passing, and electrical harmonic distortion). After entering the fluid filled region via a pipe, a significant portion of this noise is transferred to the surrounding acoustic medium and structure, potentially creating a noise hazard.

SUMMARY

The present invention provides methods and apparatus for devices to suppress tonal noise. Exemplary embodiments of a device provide a resonator that vibrates out-of-phase with respect to a noise source for reducing radiated sound power. In an exemplary embodiment, a noise suppressing device includes plates disposed in opposition having a sealed cavity therebetween.

In one aspect of the invention, a sound suppressor device comprises a first plate, a second plate in opposition to the first plate, and a connector between the first and second plates such that the first plate, the second plate, and the connector define a sealed cavity containing a gas at a pressure, wherein the device has a resonant frequency selected to vibrate out-of-phase with respect to a noise source for suppressing noise from the noise source while the noise source and the device are immersed in a liquid.

The device can further include one or more of the following features: the first and second plates are substantially parallel, a thickness of the first and second plates is selected to achieve the resonant frequency, the gas is selected to achieve the resonant frequency, a thickness of the first plate is selected to achieve the resonant frequency, a shape of the first and second plates is selected to achieve the resonant frequency, dimensions of the shape are selected to achieve the resonant frequency, the pressure of the gas is selected to achieve the resonant frequency, a distance between the first and second plates is selected to achieve the resonant frequency, a surface area of the first and second plates is selected to achieve the resonant frequency, a valve to allow dynamic adjustment of the pressure of the gas in the cavity to modify the resonant frequency of the device in response to a change in sound characteristics from the noise source, and a mechanism to change an orientation and/or position of the device in response to changes in noise characteristics of noise from the noise source.

In a further aspect of the invention, a system comprises a pump for pumping a liquid, and a sound suppressor device, which comprises: a first plate, a second plate in opposition to the first plate, and a connector between the first and second plates such that the first plate, the second plate, and the connector define a sealed cavity containing a gas at a pressure, wherein the device has a resonant frequency selected to vibrate out-of-phase with respect to a noise from the source for suppressing noise from the noise source while the noise source and the device are immersed in a liquid.

The system can further include one or more of the following features: the noise source includes a pump, the liquid is sea water, the device is placed on axis with respect to the noise source.

In another aspect of the invention, a method of suppressing noise from a noise source comprises: employing a first plate, a second plate, and a connector between the first and second plates to define a cavity having a gas at a selected pressure, wherein the first and second plates, the connector, the cavity and the gas together have a resonant frequency selected to vibrate out-of-phase with respect to a noise source for suppressing noise from the noise source.

The method can further including one or more of the following features: dynamically adjusting the pressure of the gas in the cavity to modify the resonant frequency of the device in response to a change in sound characteristics from the noise source, and adjusting a rigidity of the first plate to modify the resonant frequency of the device in response to a change in sound characteristics from the noise source and the first plate can include a selected curvature.

BRIEF DESCRIPTION OF THE DRAWINGS

The foregoing features of this invention, as well as the invention itself, may be more fully understood from the following description of the drawings in which.

DETAILED DESCRIPTION

Before describing exemplary embodiments of the invention in detail some information is provided. For sound emanating from the end of suction and discharge pipes, for example, the physics can be described as monopole acoustic radiation. That is, sound is created by an "equivalent pulsating sphere." For the pipe undergoing vibration, sound can be created by a combination of monopole, dipole, and multi-pole radiation. Dipole radiation refers to two monopoles close to each other and pulsating out of phase. An example is the back and forth motion of a pipe. Another example is quadrapole radiation cause by the pipe vibrating in an 'egg shape' pattern around its circumference. While exemplary embodiments of the invention are shown and described in conjunction with monopole noise sources, it is understood that further embodiments can include multi-pole sources.

Sound reduction can be created by passive or active techniques due to a monopole (noise suppression) source that vibrates out of phase with respect to a monopole noise source. The degree of reduction can be controlled by the amplitude of the monopole (noise suppression) source with respect to the monopole noise source. In general, active noise cancellation requires sensor(s) and a feed-back or feed-forward system to control the amplitude of the monopole (noise suppression) source. A passive system does not require feedback and can be designed for a noise source having particular characteristics.

Figure 1:
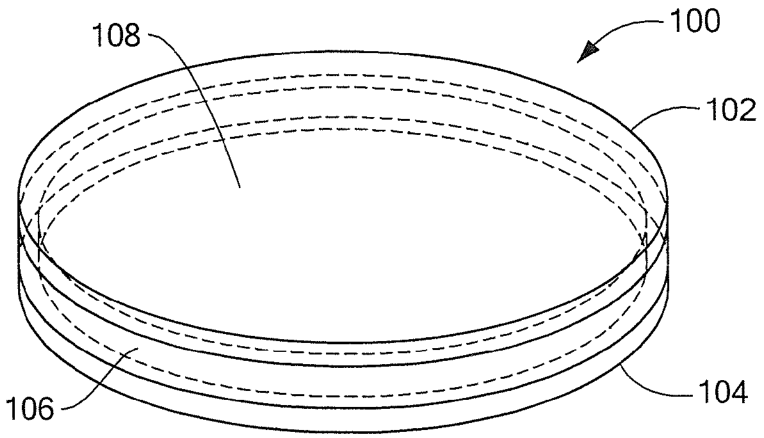
FIG. 1 is a schematic representation of a noise suppressing device in accordance with exemplary embodiments of the invention.
Figure 1A:
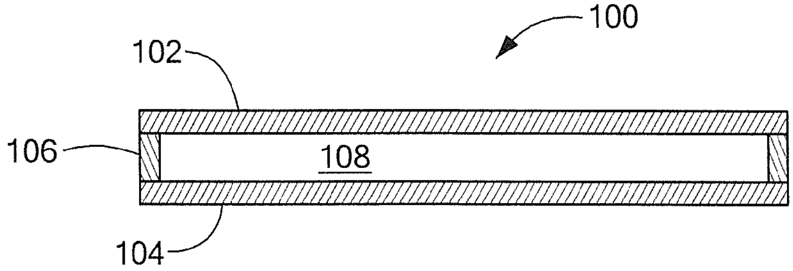
FIG. 1A is a cut-away side view of the device of FIG. 1.
Figure 1B:
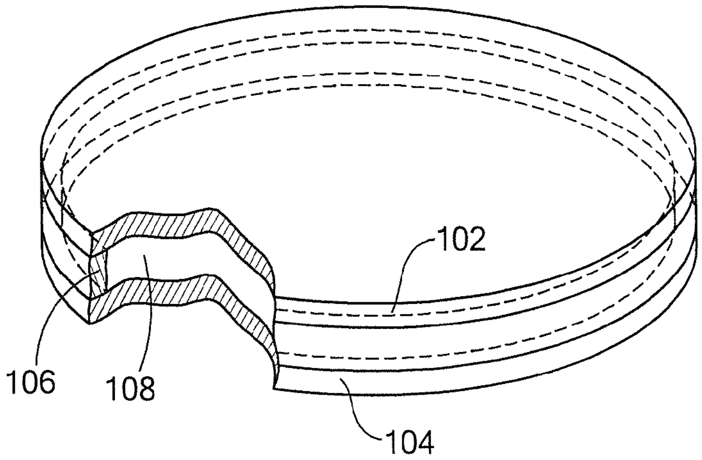
FIG. 1B is a partial cut-away view of the device of FIG. 1.

FIGS. 1, 1A, and 1B show an exemplary noise suppressor device 100 including a first plate 102 and a second plate 104 disposed in opposition. The first and second plates 102, 104 are joined about a perimeter by a connecter/spacer 106 to form a sealed chamber 108. As described more fully below, the noise suppressor 100 is effective to resonate out of phase with a tonal noise source to reduce sound from the noise source.

In general, the materials, geometry, chamber pressure, plate curvature, and the like, all contribute to the frequency response characteristics of the device. The structural features of the device can be manipulated to obtain desired characteristics to meet the needs of a particular application.

Figure 2A:
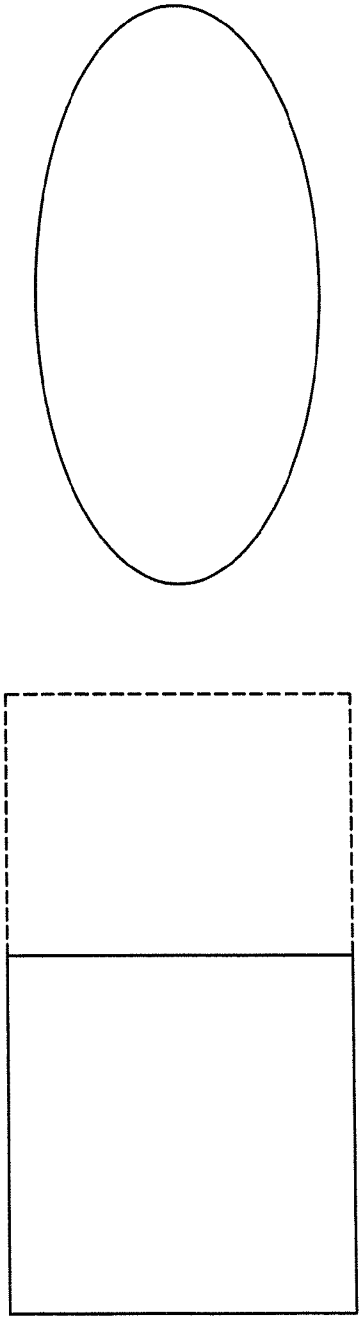
FIG. 2A is a schematic representation of an alternative embodiment of a noise suppressing device in accordance with the present invention.
Figure 2B:
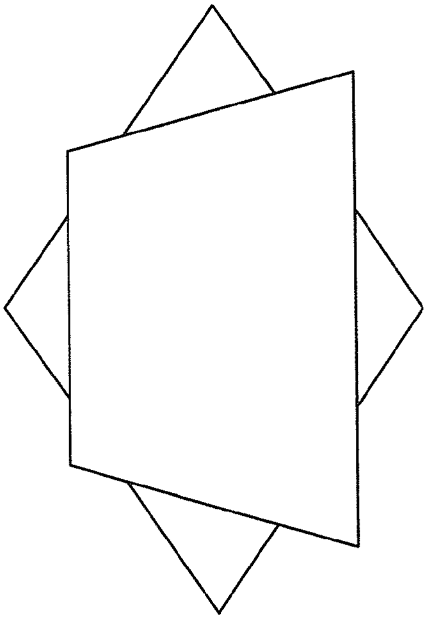
FIG. 2B is a schematic representation of another alternative embodiment of a noise suppressing device in accordance with the present invention.

In the illustrated embodiment, the first and second plates 102, 104 are circular. In other embodiments, as shown in FIG. 2A, the plates are ovular, elliptical, square, rectangular, polygonal or other shapes that define a perimeter. In one embodiment, such as the device 100 in FIG. 1, the first and second plates are substantially the same in shape, dimension, and orientation. In other embodiments, as shown in FIG. 2B the first and second plates have different shapes. In one embodiment, the first and second plates have the same shape and different orientations, such as square with corners unaligned. In another embodiment, the plates have the same shape and different sizes, such as circular plates having different diameters. In a further embodiment, centers of the first and second plates are not aligned.

Figure 2C:
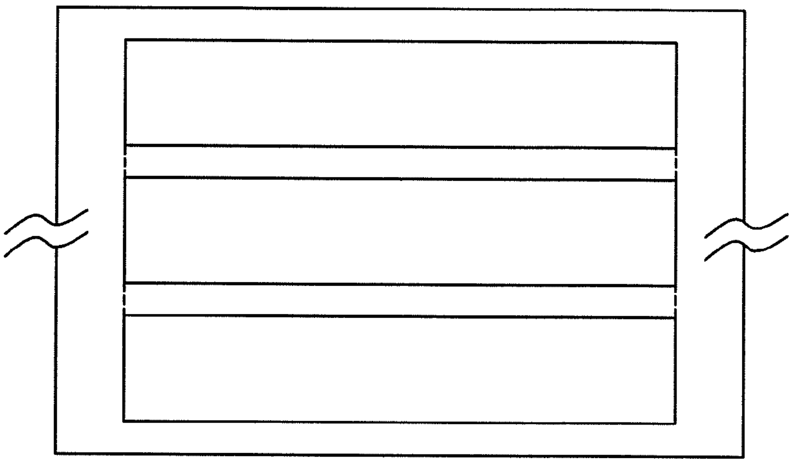
FIG. 2C is a schematic representation of another alternative embodiment of a noise suppressing device in accordance with the present invention.

While exemplary embodiments of the invention are shown and described as having first and second plates it is understood that any practical even number of plates can be used to define a selected number of connected and/or isolated chambers. The illustrative embodiment of FIG. 2C shows an even number of plates. This allows the device to have multiple volumetric resonances (i.e., the top and bottom plate vibrating out of phase) that can be tuned to multiple offending tonal noise sources. For example, in the case of four plates, two volumetric modes exist with the inner plates vibrating in-phase with respect to the adjacent outer plates, and with the inner plates vibrating out of phase with respect to the adjacent outer plates.

Figure 2D:
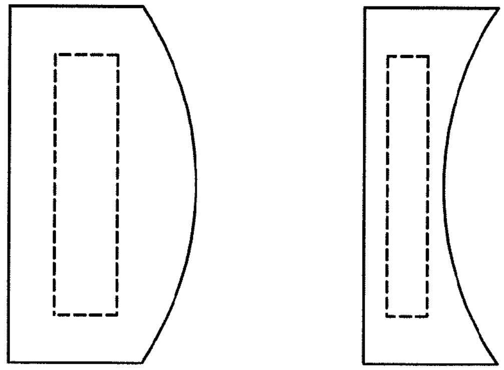
FIG. 2D is a schematic representation of another alternative embodiment of a noise suppressing device in accordance with the present invention.

In the illustrated embodiment of FIG. 1, the plates 102, 104 are substantially parallel to each other. In other embodiments, the plates are not parallel. In a further embodiment, one or more of the plates has a defined curvature, as shown in FIG. 2D. A curvature on one of both sides of a plate can alter the rigidity of the plate, and therefore, its frequency response. It is understood that the curvature can be concave or convex. In other embodiments, the cavity-side of a plate has a curvature.

Figure 2E:
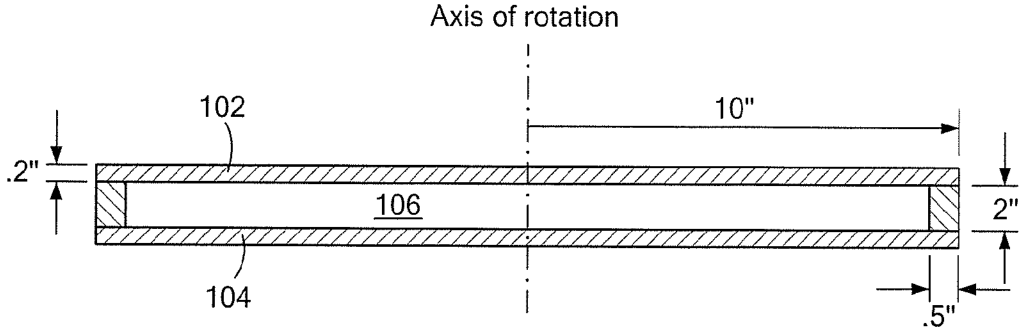
FIG. 2E is a schematic representation of an exemplary embodiment of a noise suppressing device showing illustrative dimensions.

In an exemplary embodiment shown in FIG. 2E, the first and second plates 102, 104 comprise steel about 0.2 inches thick having a radius of about ten inches with a spacer 106 about two inches in height and about 0.5 inch in thickness to separate the plates. The illustrative dimensions for a sound suppressing device are selected to suppress sound from monopole tonal noise around 120 Hertz.

It is understood that any practical dimensions and geometry can be selected to meet the needs of a particular application and noise source. For example, increases in diameter will lower the resonant frequency and increases in thickness will raise the frequency. These geometry changes along with a gas inside the device can be used to tune the absorber to perform in a specific frequency range.

In one particular embodiment, the first and second plates 102, 104 are formed from structural steel with modulus of elasticity of 30,000,000 psi and density of 0.283 pounds per cubic inch. It is understood that the plates can be formed from any suitably rigid material including metals, such as stainless steel, high strength steel alloys, and aluminum, polymers, plastics, etc. The selected material should be non-reactive with the fluid in the target environment, such as sea water and fuel oil.

In general, the chamber 106 between the plates can be pressurized to a selected level for achieving a desired frequency response. It is understood that different pressures in the chamber alter the resonant frequency of the device. Increasing the pressure increases the resonant frequency of the device while decreasing the pressure decreases the resonant frequency. In one particular embodiment, the pressure is about one atmosphere. In addition, any suitable gas can be placed in the cavity. Exemplary gases include air, nitrogen, helium, carbon dioxide, and the like.

Figure 3:
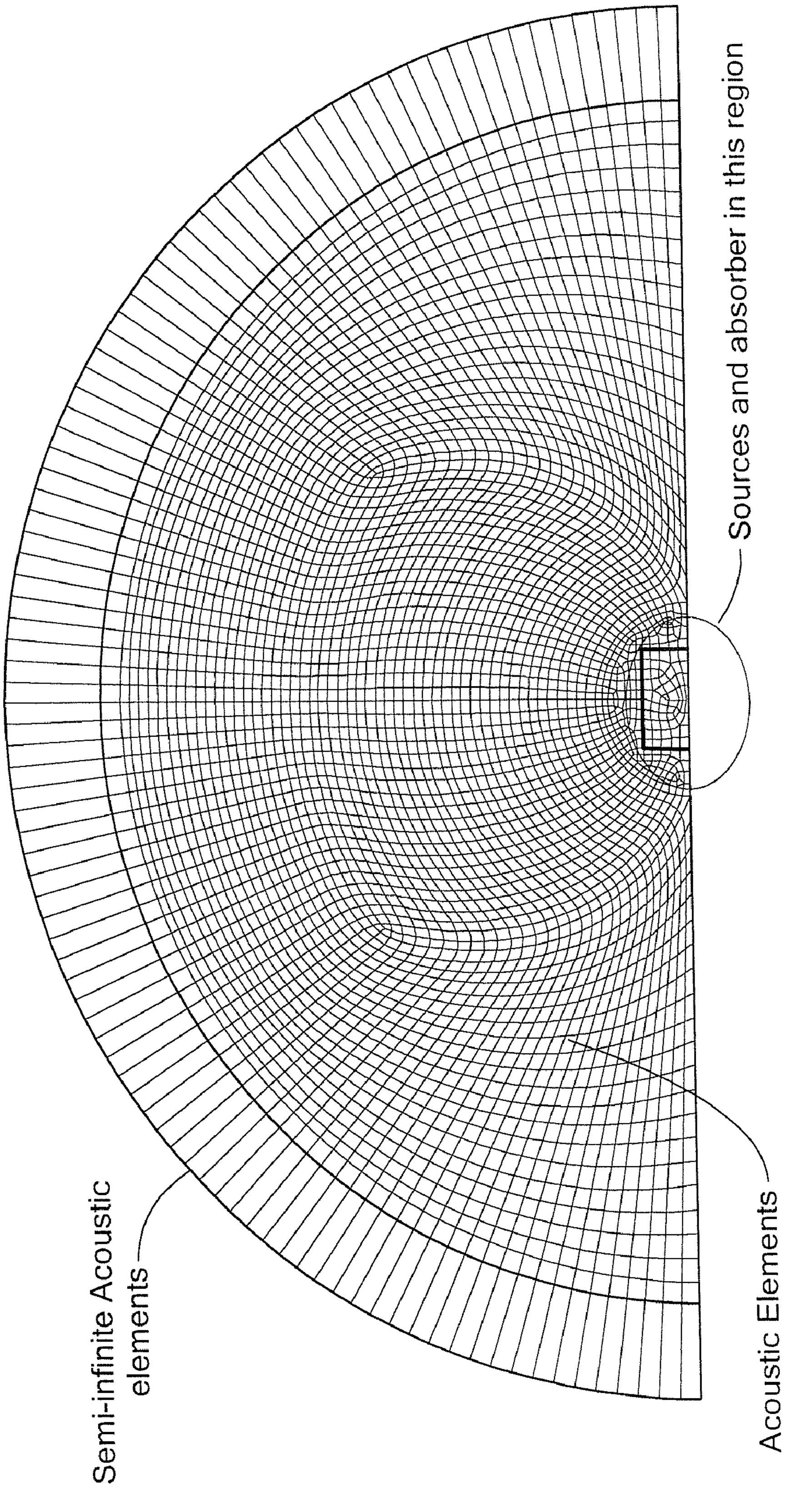
FIG. 3 shows a finite element model noise suppressor device in a free field acoustic environment.
Figure 4:
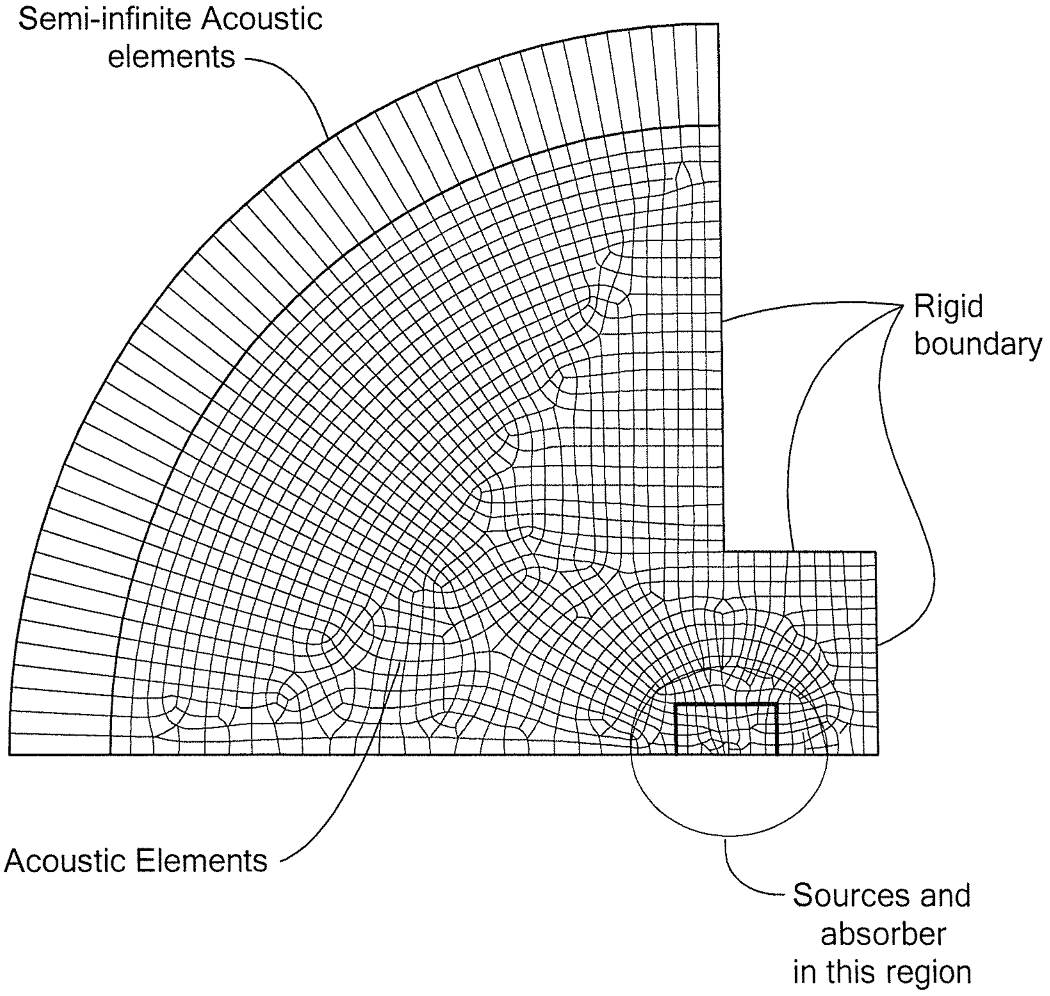
FIG. 4 shows a finite element model of a noise suppressor device in a semi-reverberant field acoustic environment.
Figure 5:
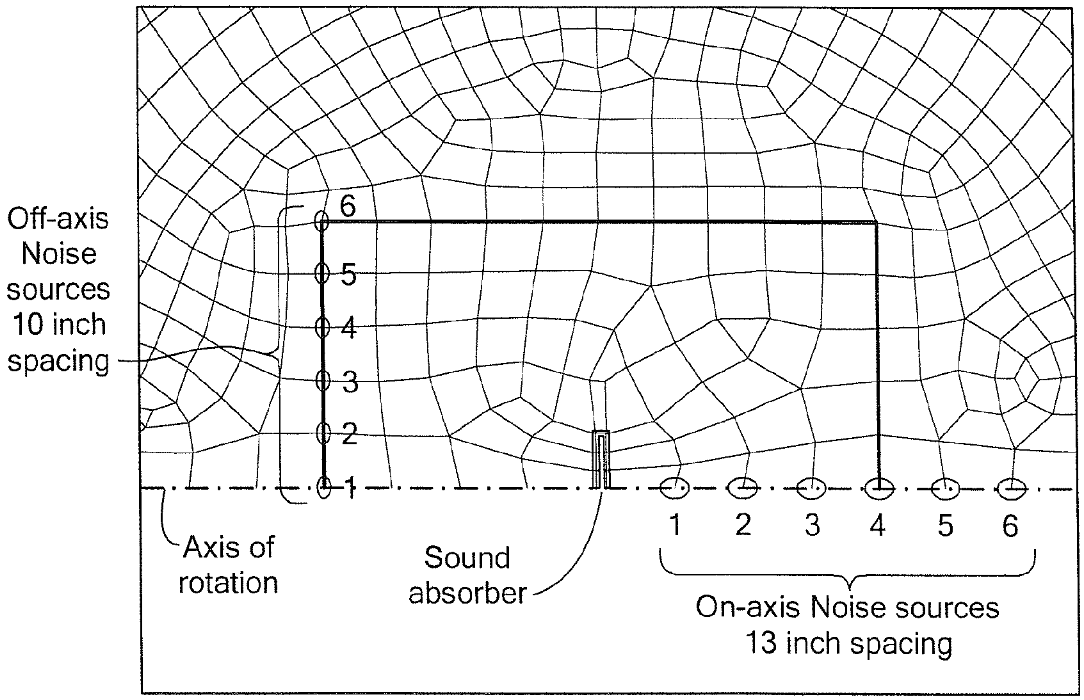
FIG. 5 shows noise source locations relative to a noise suppressor device.

The exemplary device of FIG. 2E was acoustically analyzed using the finite element computer program SARA (Structural Acoustic Radiation Analyzer). Two acoustic environments for evaluating the noise reduction performance of the design were considered FIG. 3 shows a free field environment and FIG. 4 shows a semi-reverberant environment. The semi-reverberant environment approximately simulates the noise field inside a fluid filled tank or free flood region inside a surface ship or submarine. Inside both environments is placed the simulated noise suppressor device and at various locations are placed acoustic noise sources as shown in FIG. 5.

Figure 6:
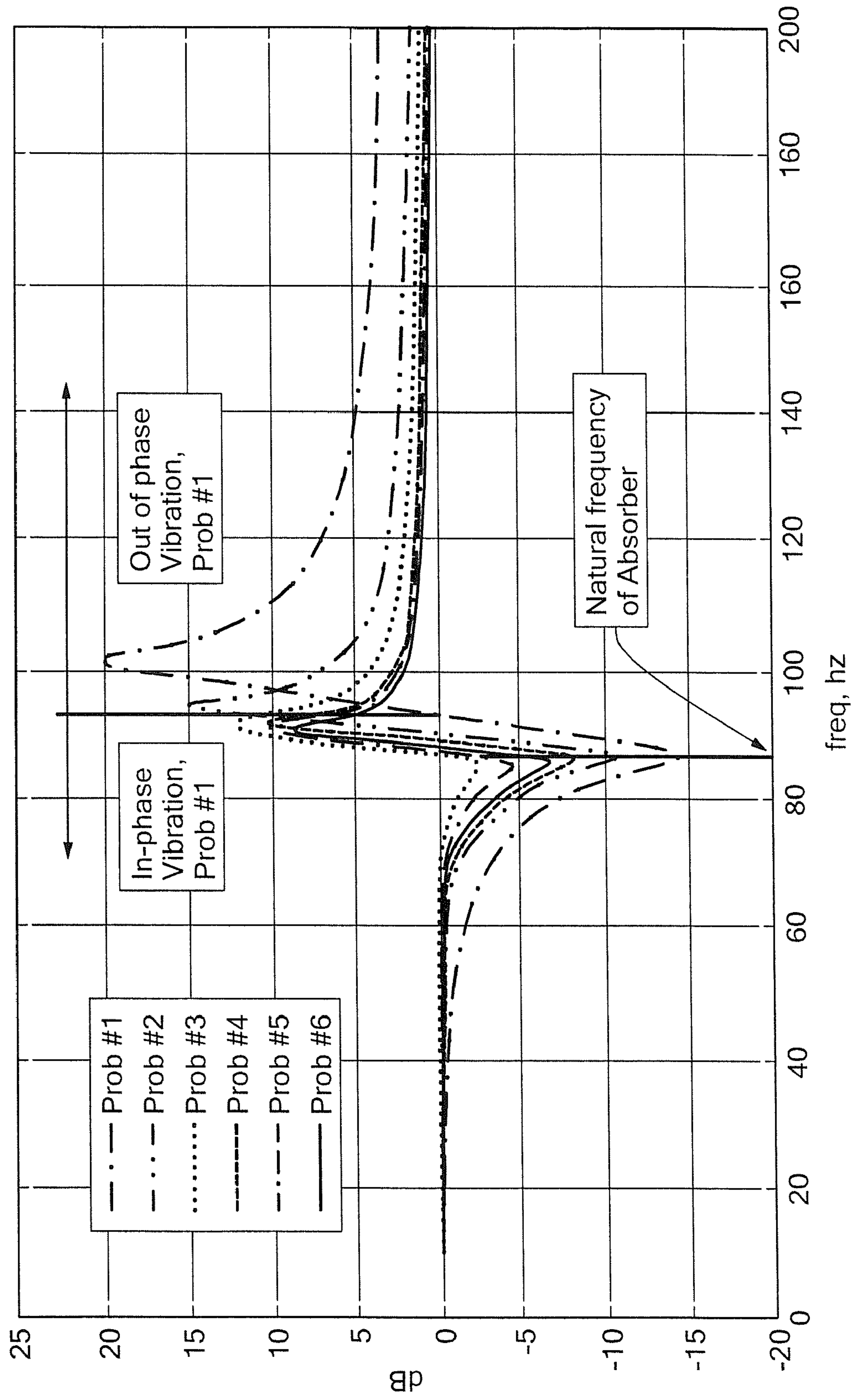
FIG. 6 is a graphical representation of simulated noise reduction results in a free field environment with on-axis noise sources.

The noise reduction (NR) performance of the simulated inventive sound suppressor device (in dB) was determined from the following equation:

$$NR(\text{dB}) = 10\log\left(\frac{\text{radiated\_power\_without\_sound\_suppressor}}{\text{radiated\_power\_with\_sound\_suppresor}}\right),$$

where a positive number means noise reduction. The results for the on-axis noise sources are shown in FIG. 6 for the free field environment and in FIG. 7 for the semi-reverberant environment. Note that the problem numbers in FIG. 5 correspond to the on-axis noise source results indicated in FIG. 6 (free field) and FIG. 7 (semi-reverberant).

For the simulations, the sound speed in water is 5000 feet/second and density is 64 pounds/cubic foot with no gas inside the sound suppression device.

As can be seen, the simulated noise suppressor/absorber device is resonant around 90 Hertz. Below the resonant frequency the device vibrates in-phase with the noise source enhancing radiation. Above the resonant frequency the device vibrates out of phase so as to diminish sound radiation. It is believed that noise reduction above resonance can be as high as 20 dB for a free field environment and 12 dB for a semi-reverberant environment. In general, as can be seen, noise reduction is enhanced as the device is placed closer to noise source. It is understood that the simulated design of the device is not optimized to produce maximum sound reduction within design constraints so that greater sound reduction can be obtained over the simulations.

Figure 7:
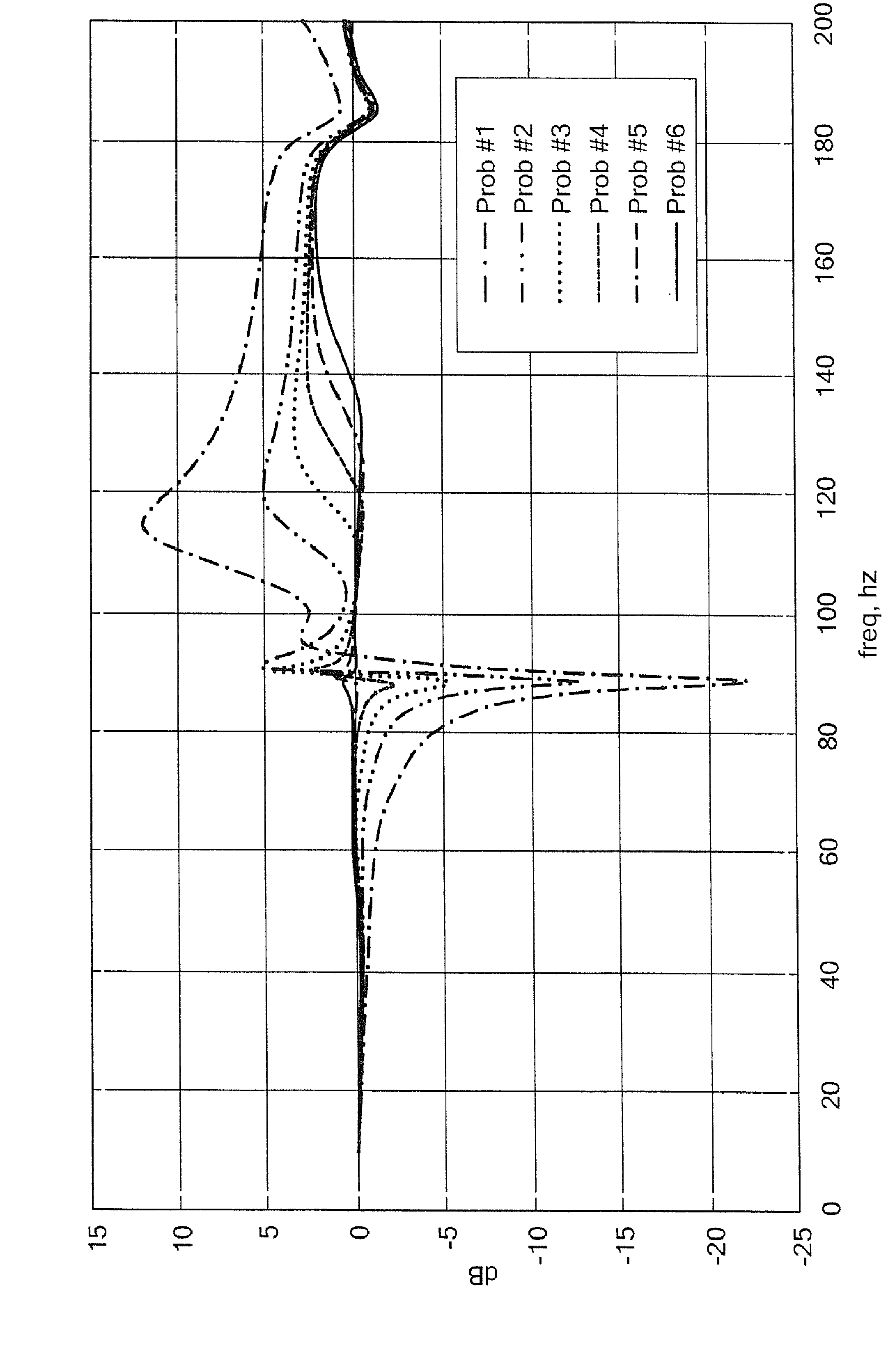
FIG. 7 is a graphical representation of simulated noise reduction results in a semi-reverberant field environment with on-axis noise sources.

FIG. 7 illustrates that the simulated device has its best noise reduction performance at about 115 Hz.

Figure 8:
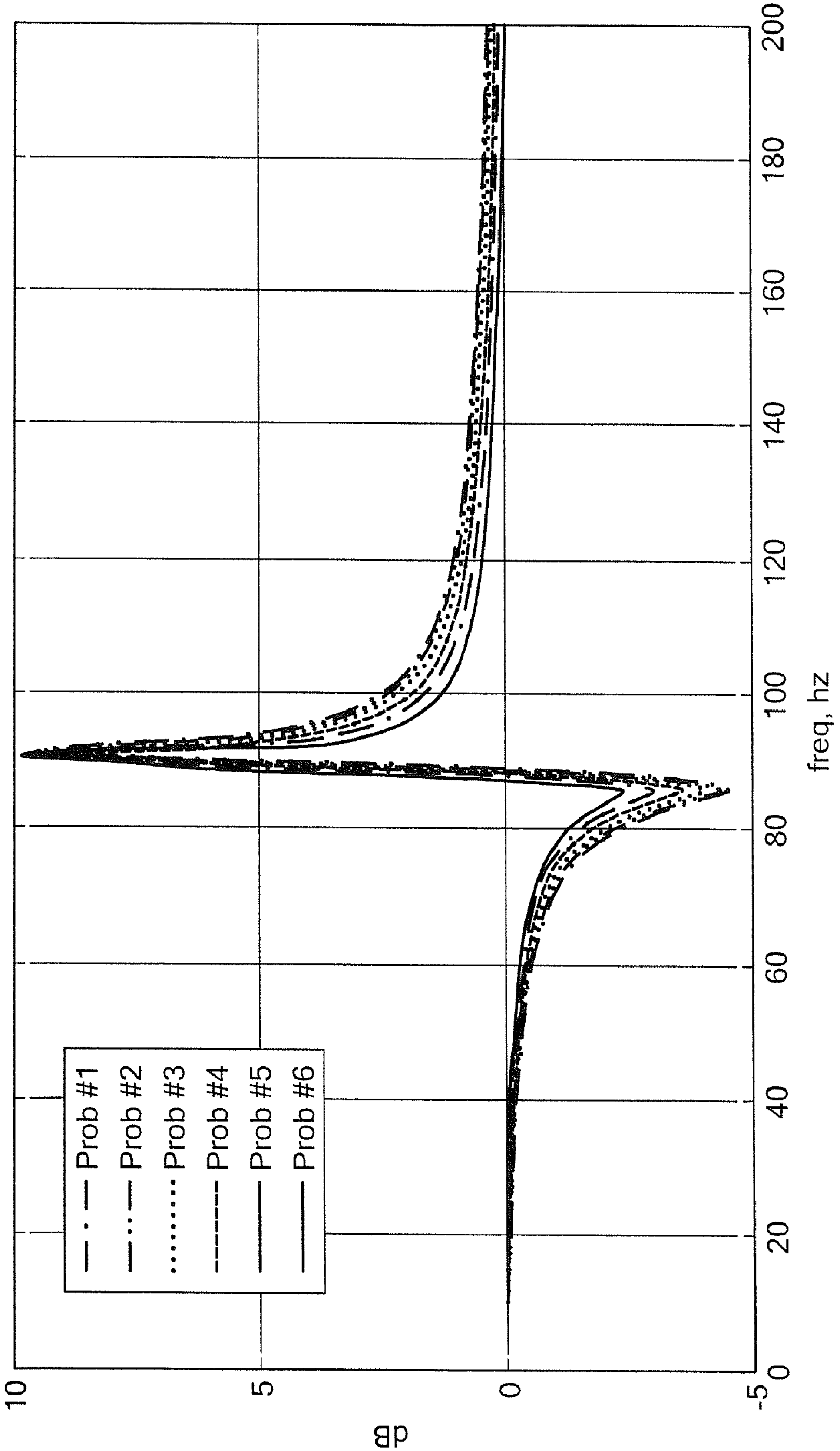
FIG. 8 is a graphical representation of simulated noise reduction results in a free field environment with off-axis noise sources.
Figure 9:
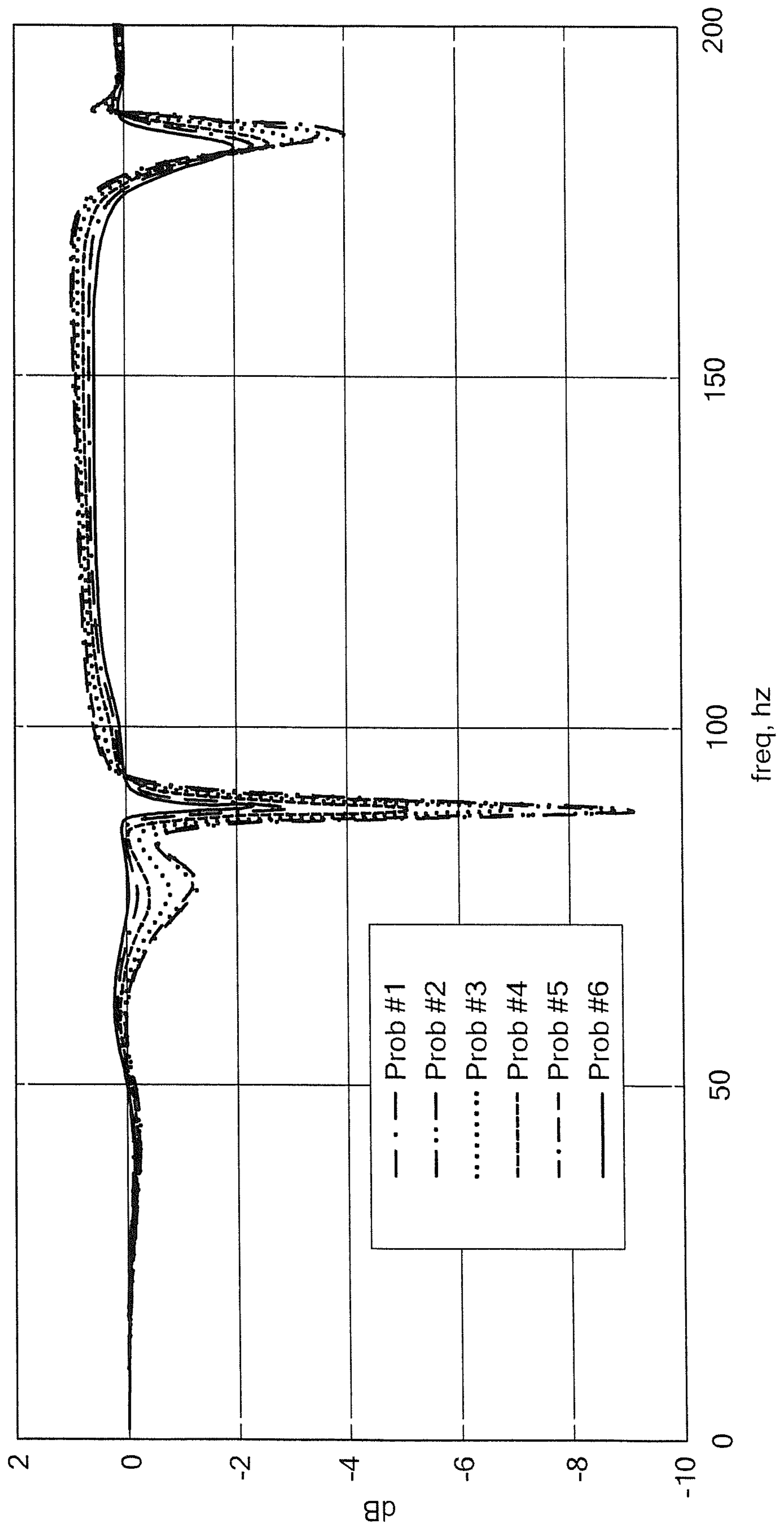
FIG. 9 is a graphical representation of simulated noise reduction results in a semi-reverberant field environment with off-axis noise sources.

FIGS. 8 (free field) and 9 (semi-reverberant) show results for the off-axis location of the noise sources shown in FIG. 5. These figures illustrate that noise reduction for the simulated noise suppressor device is significantly less than the noise reduction for the device at relatively close, on-axis source locations.

Figure 10:
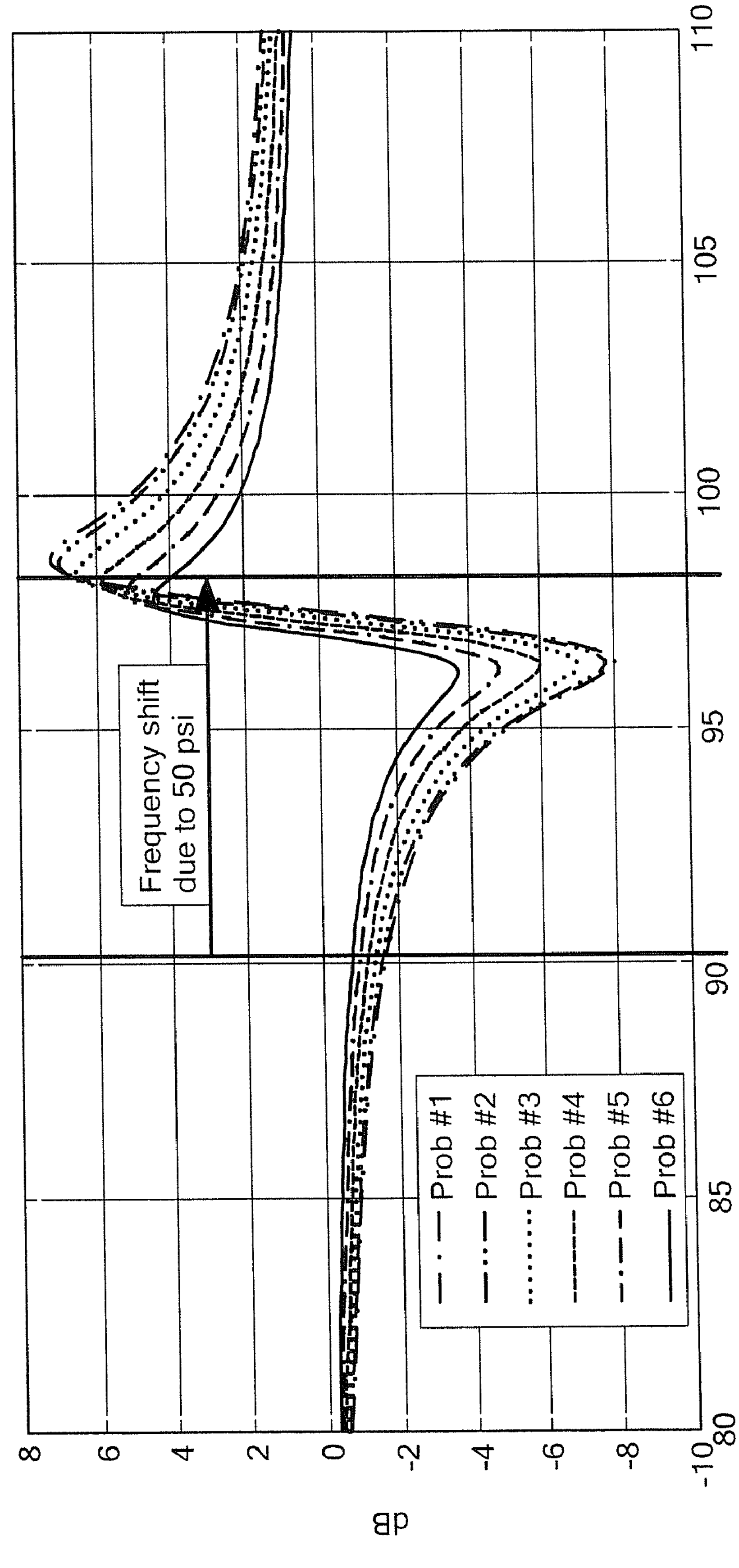
FIG. 10 is a graphical representation of frequency shift and noise reduction due to internal static pressure in a free field with off axis noise sources.

FIG. 10 shows results for a free field environment with off axis noise sources for the device of FIG. 2E with a pressure of 50 psi air at 70 degrees F. inside the chamber. As can be seen, the change from no air to 50 psi air results in a frequency shift of about 8 Hz with a relatively small decrease in noise reduction capability when compared to the curves in FIG. 8. It should be noted that pressurization can be used to tune the device to a specific frequency (e.g. frequency of noise source).

Figure 11:
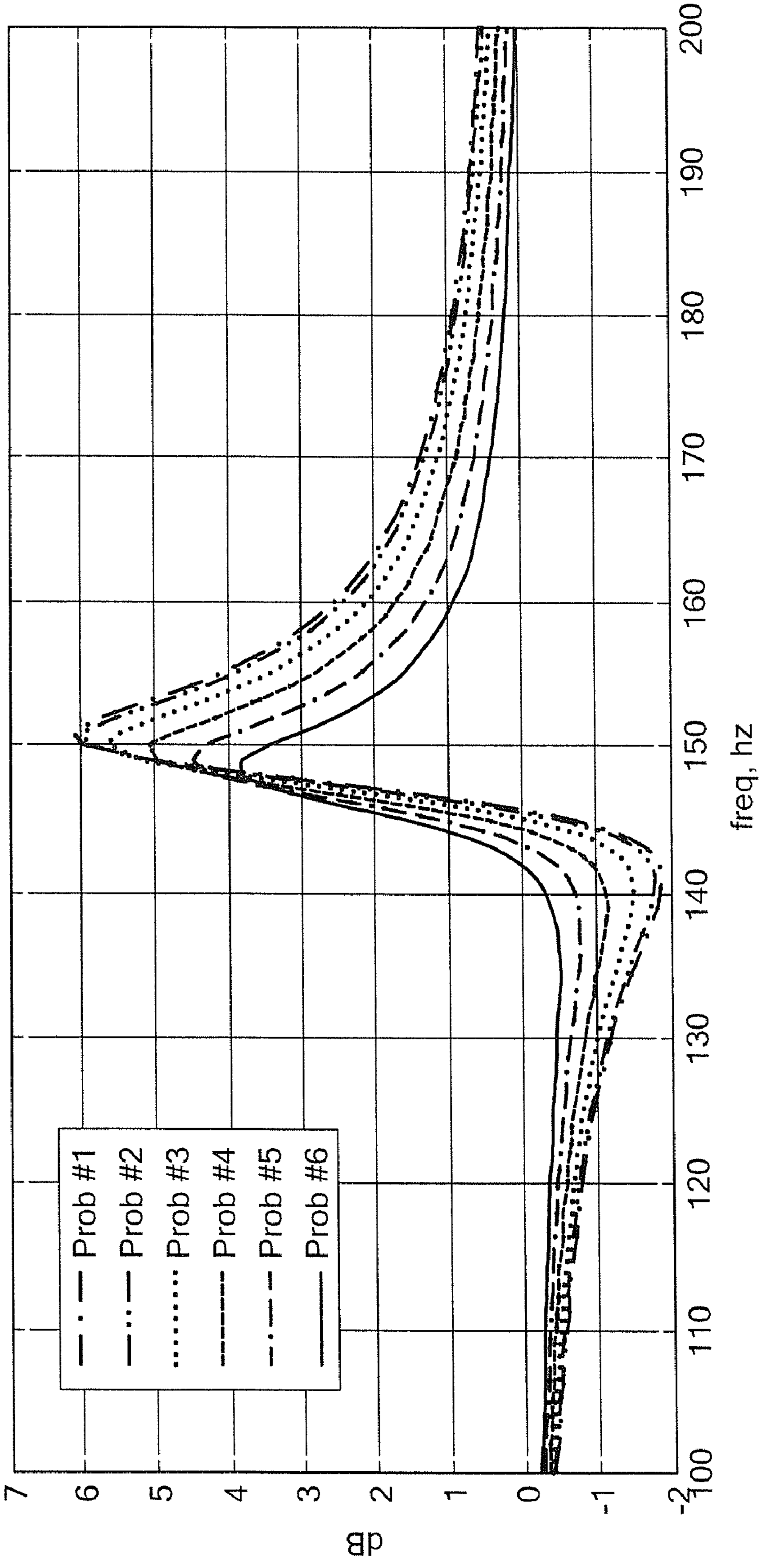
FIG. 11 is a graphical representation of frequency shift and noise reduction due to plate curvature in a free field with off axis noise sources.

FIG. 11 shows results for a free field environment with off axis noise sources for a device (see FIG. 2D) having a convex surface with a 100 inch radius of curvature imparted into the first and second plates of the device of FIG. 2E, which has a ten inch radius plate. The curvature of the plates stiffens the plates resulting in a frequency shift from about 90 Hz to about 140 Hz, as can be seen. It is understood that similar results would be obtained for a concave surface.

Simulations show that inventive flat and curved plate noise suppressor devices reduce the sound power of a monopole noise source. More specifically, the actual reduction is a function of the natural frequency of the suppressor relative to the noise source driving frequency and a function of the type of acoustic field and location of the suppressor relative to the noise source. For example, Problem #1 (source on axis 13 inches from suppressor) indicates that the optimum frequency (i.e. frequency of maximum sound power reduction) is about 100 Hertz for a suppressor in a free field environment and about 115 Hertz for a suppressor in a semi-reverberant field environment. Considering Problem #2 (source on axis 26 inches from suppressor) indicates that the optimum frequency is about 90 Hertz for a suppressor in a free field environment and about 120 Hertz for a suppressor in a semi-reverberant field environment. In other words, the optimum frequency varies with the acoustic environment and relative position of the suppressor to the noise source. Although in practice the relative positions can be accurately known, the reverberant field cannot be precisely known. For example, the amount of fluid inside the tank may vary over time, which will influence the reverberant field. It is understood that a '90 Hertz' noise suppressor device may not precisely have a 90 Hertz natural frequency when placed inside an actual tank, and the optimum frequency may be located somewhere in a frequency band approximately 20 Hertz wide, for example. Since both the natural frequency and reverberant field may not be precisely known, precise maximum sound power reduction at the driving frequency of the noise source may not be achieved with a passive device.

Figure 12:
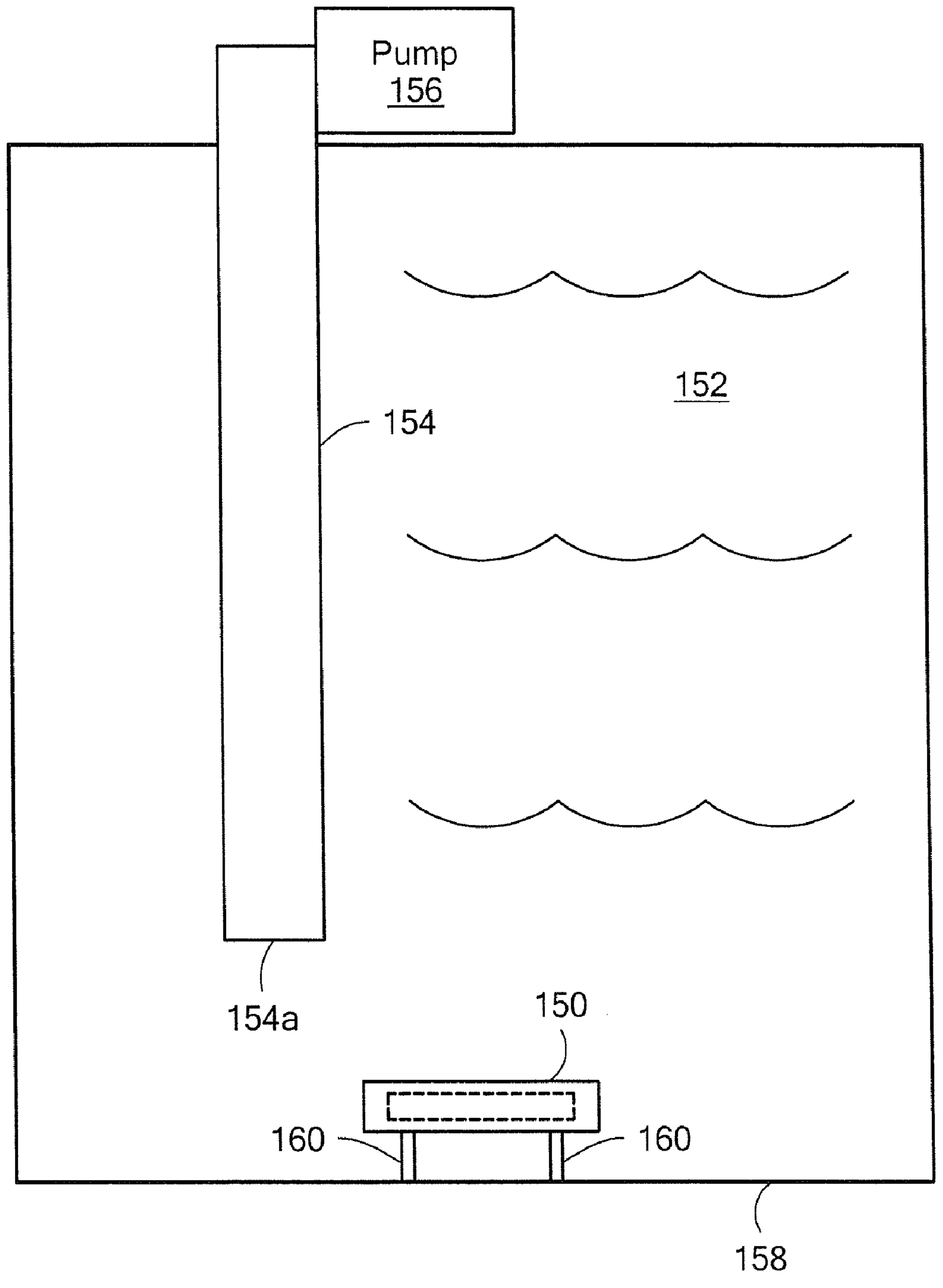
FIG. 12 is a schematic representation of a noise suppressor device in a tank with a noise source in accordance with exemplary embodiments of the invention.

FIG. 12 shows an exemplary noise suppressor device 150 in a fluid-filled tank 152 optimized for suppressing noise from a pipe 154 coupled to a pump 156. The device 150 is preferably placed relatively close to the noise source, here the pipe end 154*a,* to be effective. In one embodiment, the noise suppressor device 150 is isolated from a hull structure 158, such as by isolator mechanisms 160. The isolator mechanisms 160 are preferably connected to outer, non-radiating edges of the sound suppressing device 150.

Figure 13:
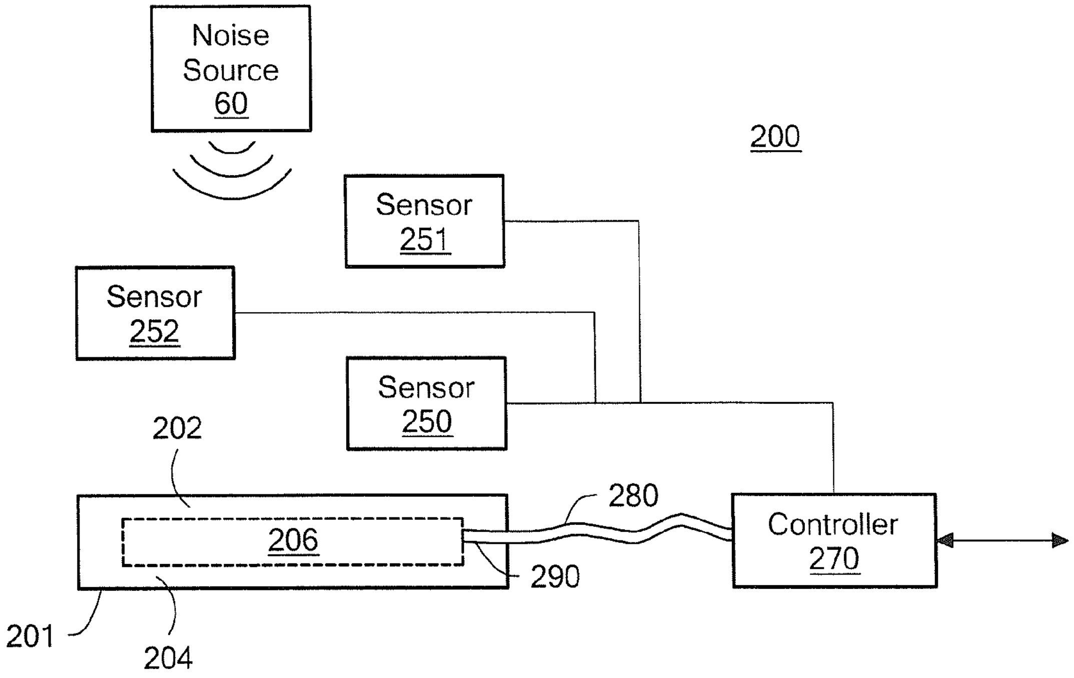
FIG. 13 is a schematic representation of an adaptive noise suppressor device in accordance with exemplary embodiments of the invention.

FIG. 13 shows an adaptive noise suppressor system 200 including a device 201 having first and second plates 202, 204 and a chamber 206. Sound sensors 250, 251, 252, which are coupled to a controller 270, are distributed within the fluid filled region (e.g. tank) and coupled to a controller 270. The sensors 250, 251, 252 detect noise generated by a noise source 60. The controller 270 controls a pressure of gas in the chamber 206 via a tube 280 extending from a valve 290 providing a fluid path to/from the chamber 206.

By detecting the characteristics of the sound generated by the noise source 60, the controller 270 can adjust the pressure of the gas in the chamber 206 to optimize noise reduction provided by the noise suppressor device 200. In one embodiment, the controller can perform fine adjustment of the chamber gas pressure for maximum noise reduction effects.

Figure 14:
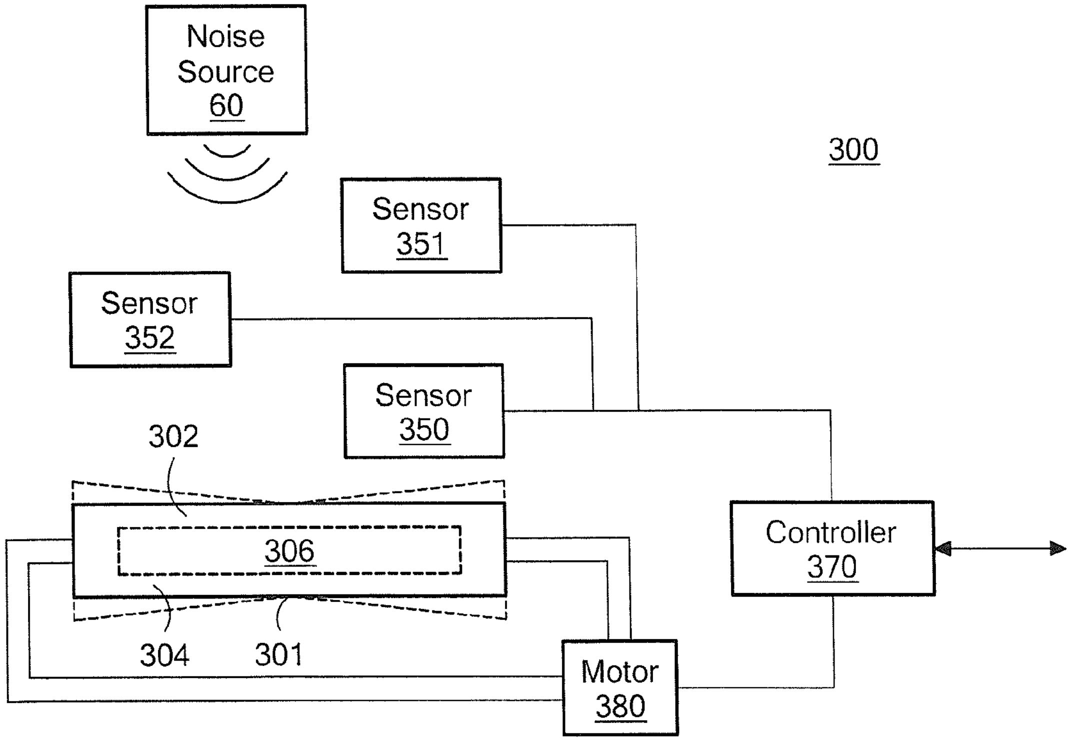
FIG. 14 is a schematic representation of a further adaptive noise suppressor device in accordance with exemplary embodiments of the invention.

FIG. 14 shows an adaptive noise suppressor system 300 including a device 301 having first and second plates 302, 304 and a chamber 306. Sound sensors 350, 351, 352, provide information on noise from the noise source 60 to a controller 370, which is coupled to a motor 380. The motor 380 can adjust a position and/or orientation of the device 301, as shown in dashed line, to optimize noise reduction provided by the system.

Figure 15:
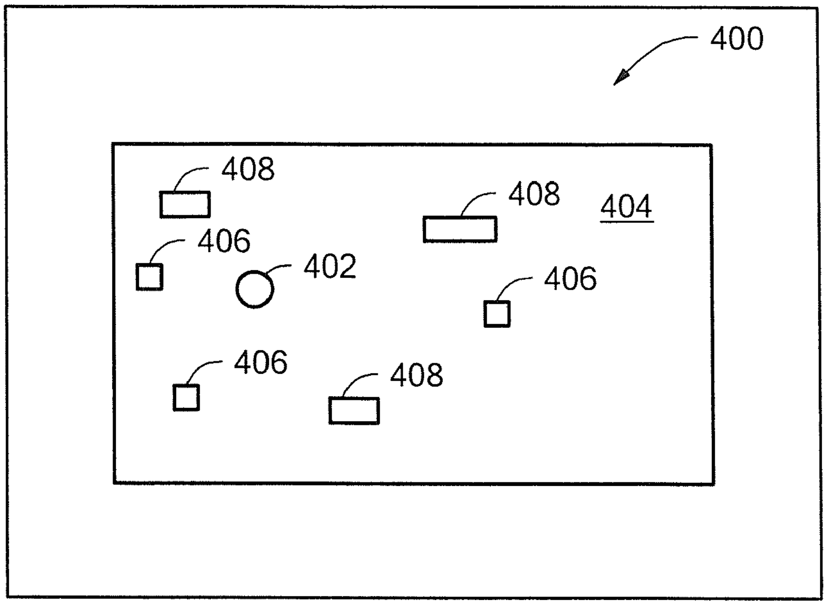
FIG. 15 is a schematic representation of a noise suppression system in accordance with exemplary embodiments of the invention.

FIG. 15 shows an exemplary system 400 including a noise source 402, such as a pump/pipe, in a free flood region 404 of a vessel, which can be surrounded by an 'infinite' water volume. A series of sensors 406 detect noise from the noise source 402 and other desired information, such as pressure, temperature, etc. Noise suppressor devices 408 are secured and isolated at selected locations to suppress noise from the noise source 402. Information from the sensors 406 can be used to adaptively tune the noise suppressor devices 408 for optimal noise reduction. As described above, adaptive tuning can include chamber pressure adjustment, plate curvature adjustment, and the like to alter the resonant frequency of the device as desired.

It is understood that noise suppression devices may be subjected to stress due to hydrostatic pressure (i.e. pressure equal to depth below free surface times water density). If the maximum von-mises stress is set equal to an allowable stress, then an equation can be established that relates allowable depth to allowable stress:

$$h_{allow} = \left( \frac{\sigma_{allow}}{\sigma_{vm,1psi}} + P_{internal} \right) \Big/ \gamma_{water}$$

where, h is the allowable depth (inches), $\sigma_{allow}$ is the allowable stress, $\sigma_{vm,1\ psi}$ is the maximum von-mises stress due to 1 psi applied to absorber determined from a FEA $P_{internal}$ is the static pressure inside the absorber (psi)

$\gamma_{water}$ is the density of water (pounds per cubic inch)

Figure 16:
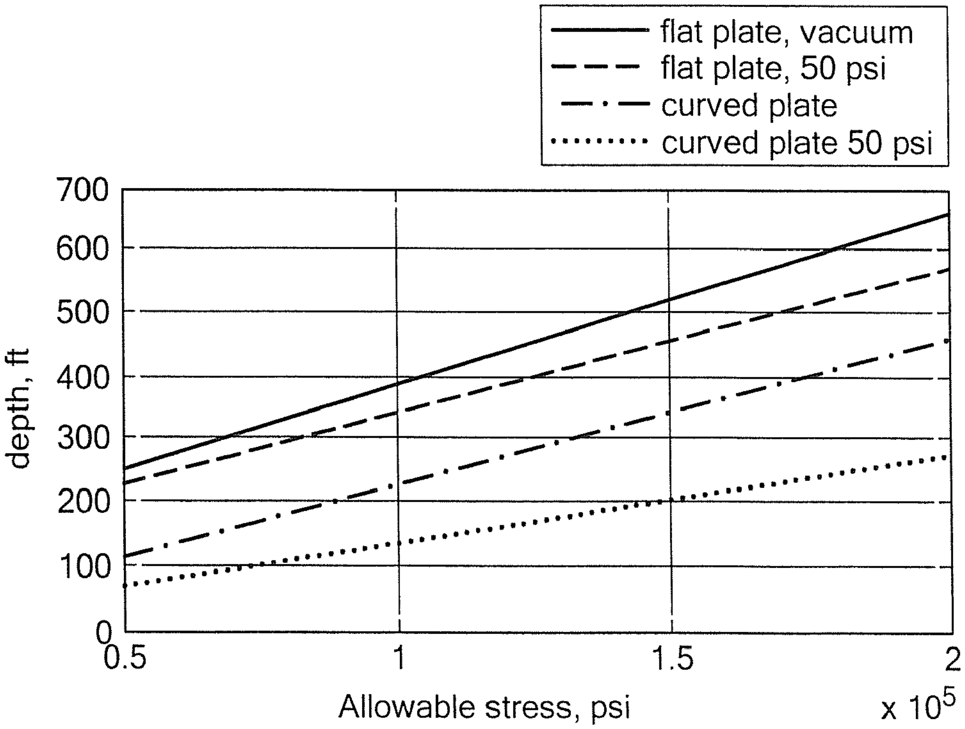
FIG. 16 is a graphical representation of allowable stress versus depth for noise suppression devices in accordance with the present invention.

Finite element stress analyses were performed on flat plate and curved plate embodiments of a noise suppressor device to determine $\sigma_{vm,1\ psi}$. Given this information along with an internal pressure of 0 psi and 50 psi, curves of allowable depth versus allowable stress were determined for the flat plate and curved plate devices. Curvature and pressurization increase the allowable depth, as shown in FIG. 16.

Consider a flat plate steel noise suppressor device with 50 psi internal pressure made from a material of yield stress 120 ksi. If it is assumed that the allowable stress is 80% of the yield stress, then the allowable depth is about 325 feet. The use of high strength composite materials increases the allowable depth.

While exemplary embodiments of the invention are primarily shown and described as having discrete first and second plates, it is understood that the plates and spacer/connector can be integrally formed, such as by injection molding or other techniques. One of ordinary skill in the art will recognize that a variety of known manufacturing techniques can be used to provide embodiments of the device as a single integral component or discrete components combined to form a noise suppressing device.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A system, comprising:
- a mechanism having a frequency at which noise is generated; and
- a sound suppressor device immersed in a first liquid located a predetermined distance from the mechanism to suppress the noise from the mechanism, the sound suppressor device comprising:
  - a first plate;
  - a second plate in opposition to the first plate;
  - a connector between the first and second plates;
  - a gas such that the first plate, the second plate, and connector define a sealed cavity containing gas at a pressure; and
  - a resonant frequency defined by the first plate, the second plate, the connector, the first liquid, and the gas, the resonant frequency corresponding to the frequency of noise generated by the mechanism, wherein the first and second plates vibrate out-of-phase with respect to the mechanism noise frequency to suppress noise from the mechanism.

2. The system according to claim 1, wherein the first liquid is water.

3. The system according to claim 1, wherein the first and second plates are substantially parallel.

4. The system according to claim 1, further including a valve to allow dynamic adjustment of the pressure of the gas to modify the resonant frequency of the device.

5. The system according to claim 1, further including a motor to change at least one of an orientation and a position of the device in response to changes in characteristics of the noise.

6. The system according to claim 5, further including at least one sensor to detect noise from the mechanism, wherein the information from the at least one sensor is used to change the at least one of the orientation and the position of the device

7. The system according to claim 1, further including a series of sound suppressor devices.

8. A method, comprising:
- identifying a noise source;
- identifying a frequency of noise generated by the noise source;
- immersing a sound suppressor device in a first liquid to suppress the noise from the noise source, wherein the sound suppressor device comprises:
  - a first plate;
  - a second plate in opposition to the first plate;
  - a connector between the first and second plates; and
  - a gas such that the first plate, the second plate, and connector define a sealed cavity containing gas at a pressure;
- selecting the first and second plates, the connector, the gas, and the pressure to define a resonant frequency corresponding to the frequency of noise generated by the noise source, wherein the first and second plates vibrate out-of-phase with respect to the noise frequency to suppress noise from the noise source; and
- locating the sound suppressor device at a predetermined distance from the noise source to suppress the noise generated by the noise source.

9. The method according to claim 8, further including adaptively positioning and/or orienting the device to optimize sound suppression of the noise.

10. The method according to claim 8, further including modifying the pressure of the gas to adjust the resonant frequency of the device.

11. The method according to claim 8, wherein the noise source is a pump on an ocean vessel.

12. The method according to claim 8, wherein the liquid is water.

13. A vessel, comprising:
- a pump for pumping a first liquid, the pump having a frequency at which noise is generated;

a sound suppressor device immersed in the first liquid located at a predetermined distance to suppress the noise from the pump, the sound suppressor device comprising:

a first plate;

a second plate in opposition to the first plate;

a connector between the first and second plates; and a gas such that the first plate, the second plate, and connector define a sealed cavity containing gas at a pressure; and a resonant frequency defined by the first plate, the second plate, the connector, the first liquid and the gas, the resonant frequency corresponding to the frequency of noise generated by the pump, wherein the first and second plates vibrate out-of-phase with respect to the pump noise frequency to suppress the pump noise.

14. The vessel according to claim 13, wherein the sound suppressor device is located in relation to an end of a pipe coupled to the pump.

15. The vessel according to claim 13, further including an isolator mechanism mechanically coupled to the sound suppressor device to isolate the sound suppressor device from a vibrating surface.

* * * * *